US012446787B2

(12) United States Patent
Boukhayma et al.

(10) Patent No.: US 12,446,787 B2
(45) Date of Patent: Oct. 21, 2025

(54) ADAPTIVE LIGHT SENSOR

(71) Applicant: Senbiosys, Neuchâtel (CH)

(72) Inventors: Assim Boukhayma, Neuchâtel (CH); Antonino Caizzone, Milvignes (CH)

(73) Assignee: Senbiosys, Neuchatel (CH)

( * ) Notice: Subject to any disclaimer, the term of this patent is extended or adjusted under 35 U.S.C. 154(b) by 507 days.

(21) Appl. No.: 17/466,557

(22) Filed: Sep. 3, 2021

(65) Prior Publication Data

US 2022/0071500 A1 Mar. 10, 2022

Related U.S. Application Data

(60) Provisional application No. 63/075,104, filed on Sep. 5, 2020.

(51) Int. Cl.
*A61B 5/024* (2006.01)

(52) U.S. Cl.
CPC .................. *A61B 5/02416* (2013.01)

(58) Field of Classification Search
CPC .......... A61B 5/02416; A61B 5/02427
See application file for complete search history.

(56) References Cited

U.S. PATENT DOCUMENTS

| | | | | |
|---|---|---|---|---|
| 2011/0112379 A1* | 5/2011 | Li | ............... | G16H 50/50 600/300 |
| 2013/0155396 A1* | 6/2013 | Deliwala | ............... | G01J 1/1626 250/208.2 |
| 2016/0174856 A1* | 6/2016 | Huang | ............... | A61B 5/02427 600/479 |
| 2020/0092504 A1* | 3/2020 | Allen | ............... | G01S 7/4816 |

FOREIGN PATENT DOCUMENTS

| | | | | |
|---|---|---|---|---|
| CN | 107530000 A | * | 1/2018 | ......... A61B 5/02427 |
| EP | 3745103 A1 | * | 12/2020 | ........... A61B 5/0042 |

OTHER PUBLICATIONS

International Preliminary Report on Patentability Received for International Application No. PCT/IB2021/058076 mailed on Mar. 16, 2023, 8 Pages.
International Search Report and Written Opinion of the International Searching Authority, mailed on Dec. 1, 2021, from International Application No. PCT/IB2021/058076, filed on Sep. 3, 2021. 13 pages.
Caizzone, A. "An ultra low-noise micropower PPG sensor," EPFL PhD Thesis (2020).
Webster, J.G., "Design of Pulse Oximeters," Bristol. PA: Philadelphia: Institute of Physics Pub., 1-256 (1997).

* cited by examiner

*Primary Examiner* — Carl H Layno
*Assistant Examiner* — Maria Catherine Anthony
(74) *Attorney, Agent, or Firm* — HoustonHogle LLP

(57) ABSTRACT

A sensor employs an adaptive light-to-digital conversion (LDC) system for high background signal applications. The system adapts the LDC resolution and the power consumption depending on the signal to background ratio. This scheme is of particular interest to photoplethysmography (PPG). The system can have a set of light-to-digital converters in which each of the light-to-digital converters includes an array of pixels and an analog to digital converter for digitizing the output from the array of pixels. Switches are then used to connect each of the light-to-digital converters to a power supply to selectively activate each of the light-to-digital converters.

20 Claims, 5 Drawing Sheets

ADAPTIVE LIGHT SENSOR

RELATED APPLICATIONS

This application claims the benefit under 35 USC 119 (e) of U.S. Provisional Application No. 63/075,104, filed on Sep. 5, 2020, which is incorporated herein by reference in its entirety.

BACKGROUND OF THE INVENTION

Nowadays, wearable devices, such as fitness trackers or smartwatches, with optical heart rate sensors, are becoming common.

The technology behind these sensors is called photoplethysmography (PPG), which is an optical measurement technique used to detect blood volume changes in living tissues. A PPG sensor requires few optoelectronics components, such as a light source, e.g. light-emitting-diode (LED) to illuminate the living tissue, a photodetector (PD) to track any light intensity variation due to the blood volume change and an analog front-end (AFE) for signal conditioning and processing. Today, the importance of PPG for medical monitoring is proven by the number of primary vital signs directly or indirectly recordable out of it.

The PPG signal is obtained by shining light from the LED at a given wavelength, in the visible or near-infrared range, into a human tissue, e.g. finger, wrist, forehead, ear lobes. The PPG sensor or photodetector detects the light transmitted through (transmissive PPG) or reflected from (reflective PPG) the tissue and transforms it into a photogenerated current. The detected signal, i.e. PPG signal, has two different components: a large DC (quasi-static) component corresponding to the light diffusion through tissues and non-pulsatile blood layers, and a small AC (pulsatile) part due to the diffusion through the arterial blood. The AC component is only a very small fraction (typically 0.2% to 2%) of the DC one, meaning the AC component is 500 to 50 times smaller than the DC component. This mostly depends on the body location and the LED wavelength and weakly on the skin tone. Such small AC/DC ratio is often called perfusion-index (PI) and ultimately sets one of the limiting challenges for any PPG readout system. Indeed, the AC component carries most of the biomedical information. Low PI values lead to reduced signal fidelity, complicated signal processing schemes and larger power consumption.

SUMMARY OF THE INVENTION

State-of-the-art PPG sensors are discrete component systems or integrated circuits (IC) embedding a photosensitive area, an analog front end (AFE) and an analog-to-digital-converter (ADC). They are often designed to cope with the worst case PI, translating into large dynamic range condition and as well large ADC resolutions (above 15 bits).

This invention concerns an adaptive light-to-digital conversion (LDC) system for high background signal applications. The system adapts the LDC resolution and the power consumption depending on the signal to background ratio. This scheme is of particular interest to photoplethysmography (PPG).

This can be used to reduce the PPG sensor power consumption by adapting the number of used sensing blocks to the measured AC/DC ratio, which exhibits dynamic changes over the measurement period.

This idea is of particular importance to applications targeting PPG sensing on body location like the finger (ring device) or ear where the PI tends to be higher than the wrist for instance. In such cases the implementation of the modular PPG sensing scheme will come with lower power consumption.

One application relates to the earbud consumer electronic devices. This is an emerging market which is just showing a small fraction of its future potential. This is particularly true in specific growing use cases such as sleep monitoring, which requires truly continuous PPG monitoring. The proposed sensor is particularly interesting in this space, due to the challenges resulting from continuously measuring a PPG signal in the ear, due to the relatively small battery size.

This solution is also of direct interest for hearing aids adding biomedical sensing. Specifically, hearing aids are getting smaller and smaller with the ultimate goal to hide it in the deep ear canal. In order to fit a PPG sensor on a hearing aid, it has to be extremely low power.

More generally, this invention relates to other light sensing applications, especially when there is a large DC background.

For PPG sensing, the present approach employs a configurable PPG sensing scheme that continuously adapts to the user's physiological conditions. This leads to an optimum power consumption, translating in longer sensing operations. This is particular relevant in the growing digital health field, since a PPG sensor has been proven to carry information about the heart rate (HR), its variability (HRV), the oxygen saturation (Sp (2)), the breathing rate (BR) and the blood pressure (BP). Continuous PPG operations have been shown to be key to detect atrial fibrillation (AFib), sleep apnea and stress.

In general, according to one aspect, the invention features a sensing system, comprising a set of light-to-digital converters in which each of the light-to-digital converters includes an array of pixels and an analog to digital converter for digitizing the output from the array of pixels and a control unit for analyzing the output from the light-to-digital converters to determine photoplethysmography (PPG) information.

The system preferably further comprises switches for connecting each of the light-to-digital converters to a power supply to selectively activate each of the light-to-digital converters.

A digital adder can be used for combining the digital outputs of each of the light-to-digital converters.

In some examples, each array of pixels might include 8 or more pixels.

In addition, the set of light-to-digital converters often includes 4 or more light-to-digital converters, or possibly maybe 16 or more.

Each of the light-to-digital converters should include an averaging unit for averaging the output from the array of pixels for the analog to digital converter.

For efficiency, the set of light-to-digital converters and the control unit can be implemented on a common silicon chip.

In general, according to another aspect, the invention features photoplethysmography (PPG) sensing method, comprising detecting light from a user with a set of light-to-digital converters in which each of the light-to-digital converters includes an array of pixels for detecting the light and an analog to digital converter for digitizing the output from the array of pixels and analyzing the output from the light-to-digital converters to determine PPG information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
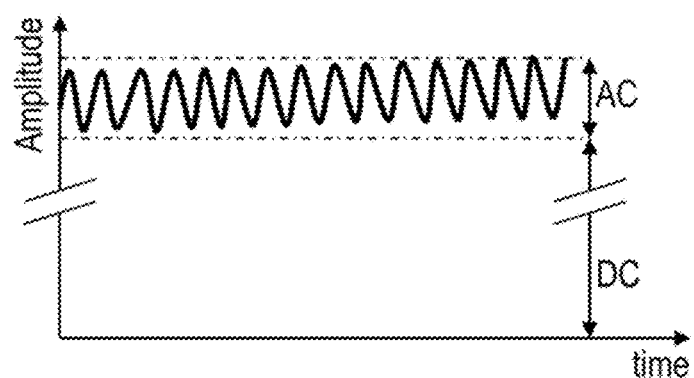
FIG. 1 is a schematic plot of the amplitude as a function of time of a PPG signal, with its DC and AC components.
Figure 2:
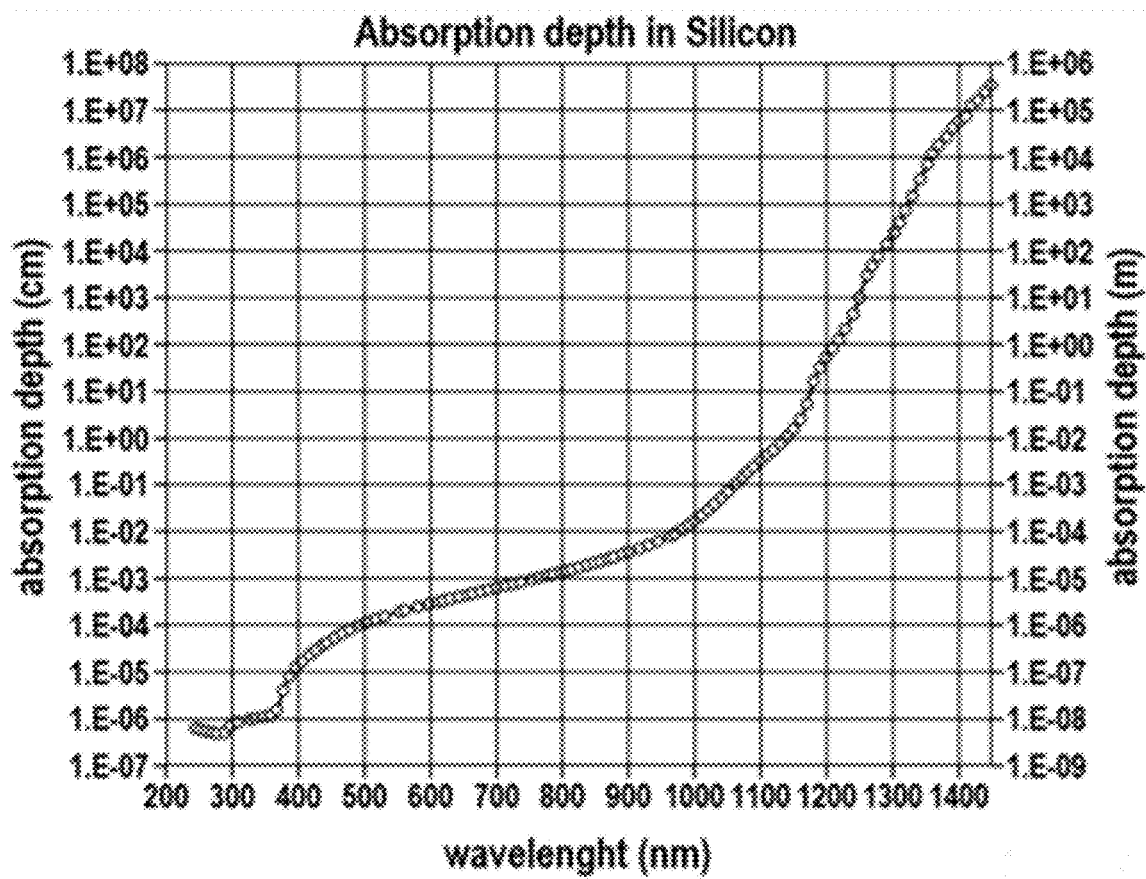
FIG. 2 is a plot of the absorption depth in silicon as a function of wavelength in nanometers.

FIG. 1 is a representation of the PPG signal, including its AC and DC components.

As above mentioned, the PPG signal perfusion-index PI is a relatively small parameter, ultimately affected by a variety of physiological characteristics such as the skin tone, location and temperature. The PI variations can reach more than 2 orders of magnitude from 0.1% to 10%.

The signal-to-noise ratio (SNR) of the PPG signal is defined as the SNR of the AC component and denoted $SNR_{AC}$.

The SNR of the total signal is denoted $SNR_{DC}$. It represents the SNR, i.e. the dynamic range, that the PPG readout chain must cope with to ensure that the required $SNR_{AC}$ can be resolved. The $SNR_{DC}$ is set upfront larger than 90 dB in order to cope with the worst case PI values.

The first noise source corrupting the signal is the photon shot noise. The shot noise variance corresponds to the mean number of integrated photons. When the shot noise dominates over the other noise sources, the $SNR_{DC}$ can be related to the number of photons, $N_{min}$, to be integrated to reach the $SNR_{DC}$ as follows:

$$SNR_{DC}=10\ log(N_{min})$$

The $SNR_{DC}$ and $SNR_{AC}$ terms are linked by the following formula:

$$SNR_{DC}=SNR_{AC}-20\ log(PI)$$

Figure 3:
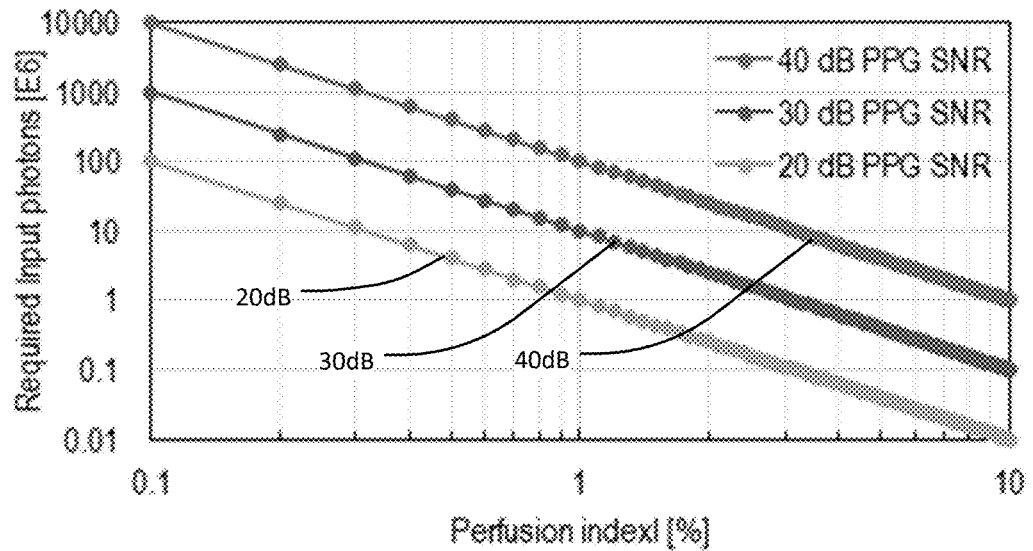
FIG. 3 is a plot of required input photons as a function of the perfusion-index (PI) for different target SNR values.

Using these first two formulas, FIG. 3 shows how the minimum number of photons required to achieve a target PPG AC SNR, $N_{min}$, evolves with the PI. The plot shows that the amount of required input photons dramatically changes with the PI for a given target PPG SNR ($SNR_{AC}$). This shows that an optimal light sensing solution must adapt to this large variation to optimize the resources instead of simply designing it to cope with the worst corner case. Indeed, the PI is a physiological parameter that continuously changes even in the same person and on the same body location, due to, for instance, temperature.

PPG photonic sensors operate as a light-to-digital converter (LDC). The photons are converted to a voltage or current that is later converted to digital counts using an analog to digital converter (ADC).

The ADC represents a large part of the complexity and power consumption of an LDC. Both the design complexity and power consumption depend on the ADC resolution.

The $SNR_{DC}$ that an LDC can achieve is limited by its ADC resolution and can be expressed as:

$$SNR_{DC}=6\times resolution-20\ log(Noise)$$

Hence the required resolution to achieve a target PPG $SNR_{AC}$ can be expressed as:

$$resolution=\frac{1}{6}\times[20\ log(Noise)+SNR_{AC}-20\ log(PI)]$$

Figure 4:
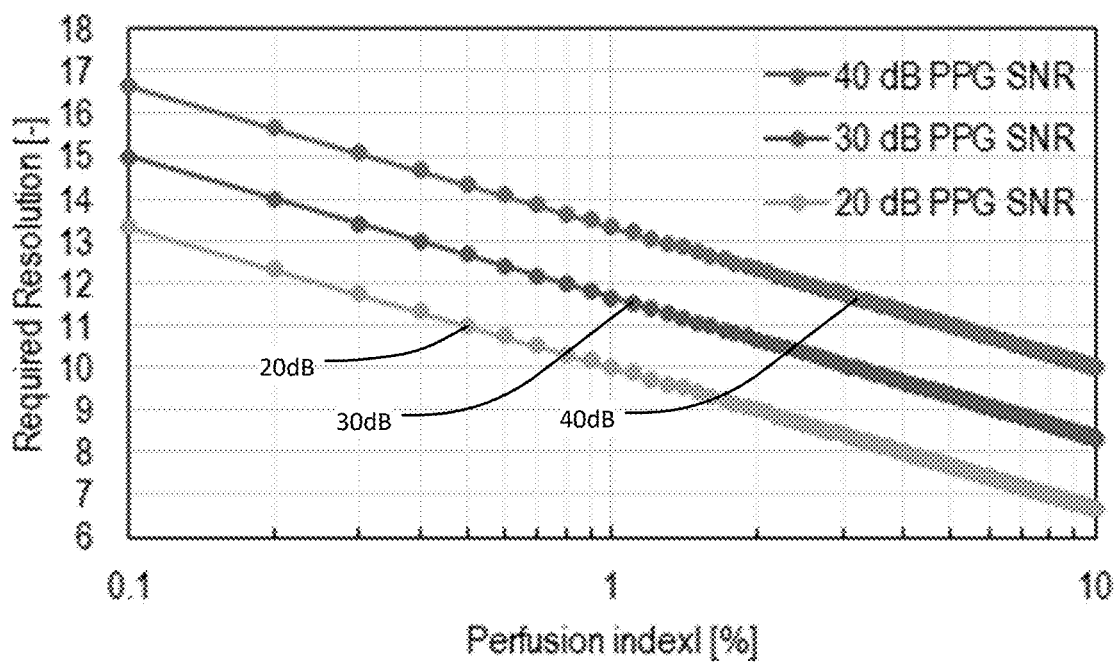
FIG. 4 is a plot showing the required ADC resolution as a function of the PI for different target SNR values.

FIG. 4 shows the required ADC resolution as a function of the PI, considering the noise equal to 1 LSB. This figure demonstrates that, as it is the case for the required input light, the ADC resolution required to cope with a target PPG signal SNR strongly depends on the PI.

In this regard, this invention concerns a modular PPG sensor architecture that wisely adapts the power consumption and resolution to the measured PI, in a continuous fashion.

Figure 5:
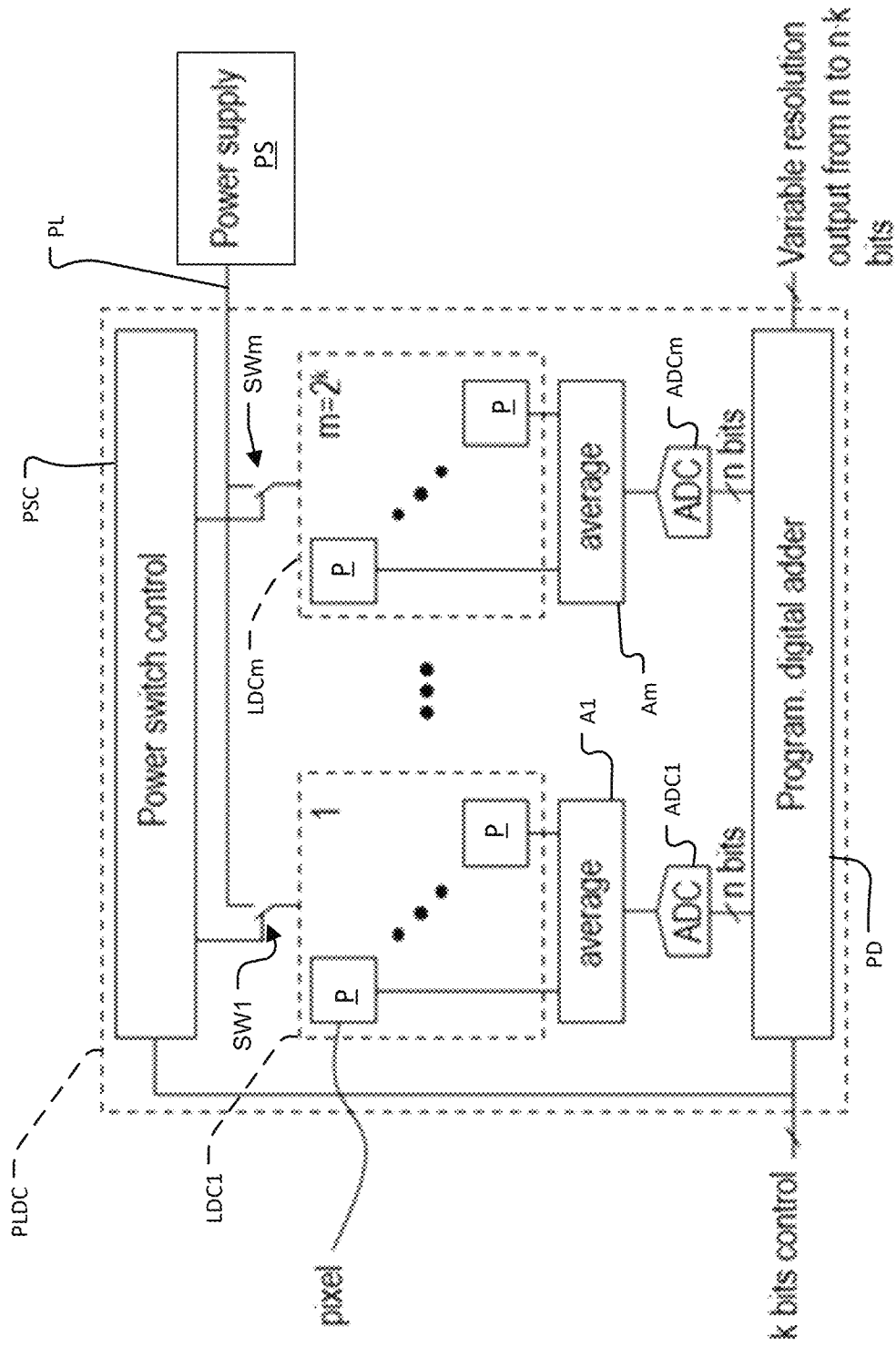
FIG. 5 is a schematic diagram of a programmable light-to-digital conversion (LDC) system according to the present invention.

FIG. 5 shows a programmable light-to-digital converter (LDC) system PLDC which has been constructed according to the principles of the present invention.

The programmable LDC system PLDC comprises $m=2^k$ LDC stages. Each LDC stage LDC1 to LDCm embeds an array of pixels P.

These pixels each include an optical sensor such as one or more photodiodes. A shared sense node is further included along with a source follower amplifier that is also shared among the one or more photodiodes.

In general, a single photodiode is used when that photodiode is large enough. In general, the number of pixels based on the number of pixels necessary to cumulate enough photons so that shot noise remains under the stage readout chain noise. In other words, the input light SNR increases with the number of photons (SNR=number of photons), it is not necessary to cumulate a number of photons leading to an SNR higher than readout chain SNR.

The output of the pixels of each stage is then averaged by a respective averaging unit A1-Am for each stage. The output of each averaging unit is then digitized by a respective n bit analog to digital converter ADC1 to ADCm. The resolution n is wisely chosen to cope with the maximum achievable SNR of the averaged array. In general, the resolution n should be at least as large as 10 bits but is usually less than 14 bits for practicality.

Each array of pixels preferably includes several pixels, such as photodiodes. In some embodiments, each LDC stage LDC1 to LDCm includes 4 or more pixels such as 8 or more or 16 or more pixels.

Each light-to-digital converter LDC1-LDCm is connected to the power line PL with a respective switch SW1-SWm. The power line PL distributes power from a power supply PS, such as a battery. The switches SW1-SWm are controlled by a power switch control unit PSC that powers-on the required number of light-to-digital converters.

The ADC outputs are connected to a programmable adder PD that accumulates the outputs of the activated LDCs to increase the resolution. When $2^k$ LDCs are activated, the resolution is increased to "n+k" bits. By adding words of a given number of bits (resolution) we get a word with higher number of bits. This is how resolution increases.

The table below shows an example of how the resolution and the maximum $SNR_{DC}$ evolve with the number of activated LDCs. This example considers a basic LDC featuring 12 bits ADC.

| Number of LDCs (m) | Resolution [bit] | $SNR_{DC}$ [dB] |
|---|---|---|
| 1 | 12 | 72 |
| 2 | 13 | 78 |
| 4 | 14 | 84 |
| 8 | 15 | 90 |
| 16 | 16 | 96 |

Generally, the practical lower limit to the number activated LDCs is 2 and reasonable maximum is 16, or more of smaller pixels are used.

Figure 6:
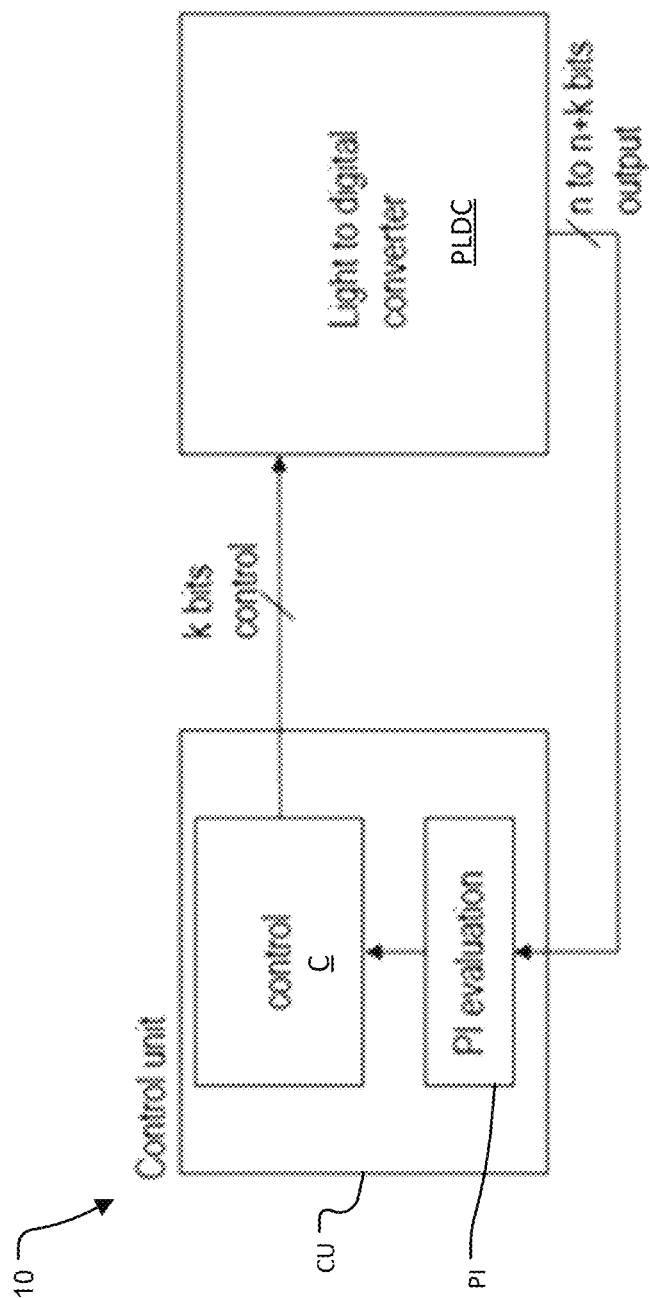
FIG. 6 is a schematic diagram of an adaptive PPG sensor system-on-chip.

FIG. 6 shows a possible embodiment of the proposed modular architecture for a PPG system 10 that includes the programmable LDC system PLDC of FIG. 5. This is preferably implemented using a system-on-a-chip configuration. The chip contains the entire PPG system 10 so that a single piece of silicon embeds both the programmable LDC system PLDC, the perfusion index evaluation block PI and a controller C as part of a control unit CU. Specifically, the controller C provide k control bits to the programmable LDC system PLDC. These control bits are received by the power switch control unit PSC that then adapts the number of LDCs of the programmable LDC PLDC that are powered and digitally accumulated to the perfusion index evaluation block PI.

In operation, the PI evaluation block determines a perfusion index from the n to n+k output bits from the activated light-to-digital converters LDC1-LDCm. The controller C then determines PPG information such as the heart rate (HR), its variability (HRV), the oxygen saturation (SpO2), the breathing rate (BR) and the blood pressure (BP) for the user.

In operation, if the PI can not be calculated due tolow SNR or the resolution (number of activated LDCs is low for the resolution), the the controller C signals the a power switch control unit PSC to activate by providing power to an additional light-to-digital converter.

Figure 7:
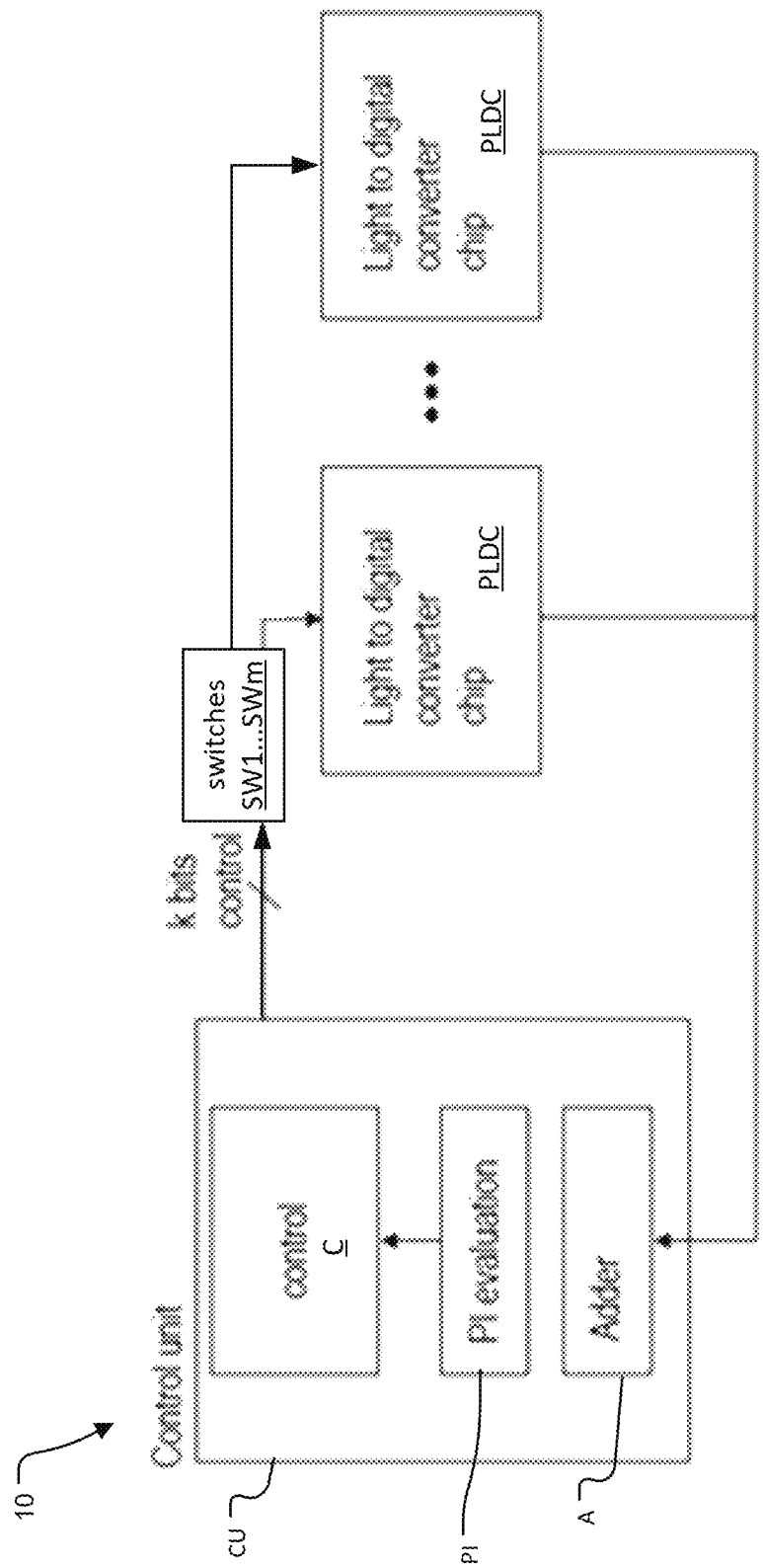
FIG. 7 is a schematic diagram of an adaptive sensor distributed system.

FIG. 7 shows another embodiment in which the modular PPG sensing system 10 is distributed on a plurality of connected chips wisely distributed spatially. Each of these chips includes a separate programmable LDC PLDC that are controlled by the control unit 1010. In addition, an adder A is further provided. The adder adds up the outputs of the different activated LDCs in order to achieve higher resolution data with spatial averaging. In some examples, four or more separate programmable LDC PLDC are included.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sensing system, comprising:
a set of light-to-digital converters in which each of the light-to-digital converters includes an array of pixels and an analog to digital converter for digitizing the output from the array of pixels;
switches to connect each of the light-to-digital converters to a power supply to selectively activate each of the light-to-digital converters, and
a control unit for analyzing the output from the light-to-digital converters to determine photoplethysmography (PPG) information,
wherein the control unit detects light from a user via the set of light-to-digital converters and adapts system resolution and power consumption in response to a signal-to-background ratio by selectively powering each of the light-to-digital converters via the switches and the power supply to selectively activate each of the light-to-digital converters.

2. The system as claimed in claim 1, further comprising a digital adder for combining the digital outputs of each of the light-to-digital converters.

3. The system as claimed in claim 1, wherein the control unit determines a heart rate of the user.

4. The system as claimed in claim 1, wherein each array of pixels includes 8 or more pixels.

5. The system as claimed in claim 1, wherein the set of light-to-digital converters includes 4 or more light-to-digital converters.

6. The system as claimed in claim 1, wherein the set of light-to-digital converters includes 8 or more light-to-digital converters.

7. The system as claimed in claim 1, wherein each of the light-to-digital converters includes an averaging unit for averaging the output from the array of pixels for the analog to digital converter.

8. The system as claimed in claim 1, wherein the set of light-to-digital converters and the control unit are implemented on a common silicon chip.

9. The sensing system as claimed in claim 1, wherein the control unit is further configured to adjust the power supplied to each light-to-digital converter based on a continuously monitored perfusion index to maintain optimal signal quality while reducing power consumption.

10. A photoplethysmography (PPG) sensing method, comprising:
 detecting light from a user with a set of light-to-digital converters in which each of the light-to-digital converters includes an array of pixels for detecting the light and an analog to digital converter for digitizing the output from the array of pixels;
 analyzing the output from the light-to-digital converters to determine PPG information, and
 adapting system resolution and power consumption in response to a signal-to-background ratio by selectively powering each of the light-to-digital converters to a power supply to selectively activate each of the light-to-digital converters.

11. The method as claimed in claim 10, further comprising combining the digital outputs of each of the light-to-digital converters.

12. The method as claimed in claim 10, further comprising determining a heart rate of a user based on the PPG information.

13. The method as claimed in claim 10, wherein each of the array of pixels includes 8 or more pixels.

14. The method as claimed in claim 10, wherein the set of light-to-digital converters includes 4 or more light-to-digital converters.

15. A method as described in claim 10, further comprising correlating the detected photoplethysmographic signals from multiple light-to-digital converters to identify health conditions including atrial fibrillation, sleep apnea, and heart rate variability.

16. A sensing system, comprising:
 a set of light-to-digital converters in which each of the light-to-digital converters includes:
  an array of pixels,
  an averaging unit for averaging the output from the array of pixels, and
  an analog to digital converter for digitizing the averaged output from the averaging unit;
 a control unit for analyzing the digitized averaged output to determine photoplethysmography (PPG) information;
 switches for connecting each of the light-to-digital converters to a power supply to selectively activate each of at least one of the light-to-digital converters, wherein the control unit detects light from a user via the set of light-to-digital converters and adapts system resolution and power consumption in response to a signal-to-background ratio by selectively powering each of the light-to-digital converters via the switches and the power supply to selectively activate each of the light-to-digital converters; and
 a digital adder for combining the digital outputs of each of the selectively activated light-to-digital converters.

17. The system as claimed in claim 16, further comprising a perfusion-index (PI) evaluator, wherein the switches selectively activate based on a determined PI.

18. The system as claimed in claim 16, wherein the control unit determines at least one of: heart rate (HR), heart rate variability (HRV), oxygen saturation (SpO2), breathing rate (BR), blood pressure (BP), atrial fibrillation (AFib), sleep apnea and/or stress.

19. The system as claimed in claim 16, wherein the system in at least one of: a finger ring device, a hearing aid, and/or an earbud.

20. The system as claimed in claim 16, wherein the set of light-to-digital converters includes 4 or more light-to-digital converters.

* * * * *